United States Patent
Takahashi (10) Patent No.: US 9,634,532 B2
(45) Date of Patent: Apr. 25, 2017

(54) INERTIAL DRIVE ACTUATOR

(71) Applicant: OLYMPUS CORPORATION, Tokyo (JP)

(72) Inventor: Masaya Takahashi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 487 days.

(21) Appl. No.: 14/150,100

(22) Filed: Jan. 8, 2014

(65) Prior Publication Data

US 2014/0183982 A1 Jul. 3, 2014

Related U.S. Application Data (63) Continuation of application No. PCT/JP2012/067297, filed on Jul. 6, 2012.

(30) Foreign Application Priority Data

Jul. 8, 2011 (JP) ................. 2011-151809

(51) Int. Cl.
  *H02K 1/34* (2006.01)
  *H02N 2/02* (2006.01)
(52) U.S. Cl.
  CPC .............. *H02K 1/34* (2013.01); *H02N 2/025* (2013.01)
(58) Field of Classification Search
  CPC .............................. H02N 2/026; H02N 2/025
  USPC .................... 310/329, 328, 323.02; 74/99 R
  See application file for complete search history.

(56) References Cited

U.S. PATENT DOCUMENTS

| | | |
|---|---|---|
| 5,134,335 A | 7/1992 | Ikemoto et al. |
| 5,663,855 A * | 9/1997 | Kim ............. G11B 5/54 360/256.2 |
| 7,535,661 B2 | 5/2009 | Matsuki |

(Continued)

FOREIGN PATENT DOCUMENTS

| | | |
|---|---|---|
| JP | 01-138975 A | 5/1989 |
| JP | 04-000273 A | 1/1992 |

(Continued)

OTHER PUBLICATIONS

Extended Supplementary European Search Report dated Mar. 23, 2015 from related European Application No. 12 81 1901.3.
International Preliminary Report on Patentability dated Jan. 23, 2014 from related International Application No. PCT/JP2012/067297, together with an English language translation.
International Search Report dated Oct. 2, 2012 issued in PCT/JP2012/067297.

*Primary Examiner* — Shawki S Ismail
*Assistant Examiner* — Bryan Gordon
(74) *Attorney, Agent, or Firm* — Scully, Scott, Murphy & Presser, P.C.

(57) ABSTRACT

An inertial drive actuator includes a shift unit that generates a shift in a first direction and in a second direction opposite to the first direction, a base plate that moves with the shift of the shift unit, and a mover disposed on a surface of the base plate and having a magnetic field generating unit. The mover has a first yoke that guides magnetic flux generated by the magnetic field generating unit such that the magnetic flux concentrates on a surface of the mover facing the base plate with respect to both S and N poles. Also included is a second yoke provided on a side of the base plate facing away from the mover. The frictional force acting between the mover and the base plate is controlled by controlling a magnetic field generated by the magnetic field generating unit to drive the mover.

13 Claims, 9 Drawing Sheets

(56) References Cited

U.S. PATENT DOCUMENTS

| | | | |
|---|---|---|---|
| 2006/0103266 A1* | 5/2006 | Okamoto | H02N 2/025 310/328 |
| 2007/0241640 A1 | 10/2007 | Matsuki | |
| 2008/0230694 A1* | 9/2008 | Frosien | H01J 37/12 250/307 |
| 2009/0015949 A1* | 1/2009 | Matsuki | H02N 2/025 359/824 |
| 2009/0021114 A1* | 1/2009 | Adachi | H01L 41/083 310/323.16 |
| 2009/0039875 A1* | 2/2009 | Hoshino | G01D 5/145 324/207.21 |
| 2009/0189486 A1 | 7/2009 | Matsuki | |
| 2009/0277300 A1* | 11/2009 | Matsuki | G01D 5/2412 74/99 R |
| 2011/0013029 A1* | 1/2011 | Akutsu | G03B 5/00 348/208.11 |

FOREIGN PATENT DOCUMENTS

| | | | |
|---|---|---|---|
| JP | 06292374 A | 10/1994 | |
| JP | H10-257786 A | 9/1998 | |
| JP | 11-69847 A | 3/1999 | |
| JP | 11136979 A | 5/1999 | |
| JP | 2007129821 A | 5/2007 | |
| JP | 2007-288828 A | 11/2007 | |
| JP | 2008072438 A | 3/2008 | |
| JP | 2009-177974 A | 8/2009 | |
| JP | 2009273253 A | 11/2009 | |
| JP | 5185640 B2 | 4/2013 | |
| WO | 2011055427 A1 | 5/2011 | |

\* cited by examiner

INERTIAL DRIVE ACTUATOR

CROSS REFERENCE TO RELATED APPLICATIONS

The present application is a continuation of PCT/JP2012/067297, filed on Jul. 6, 2012, which is based upon and claims the benefit of priority from Japanese Patent Application No. 2011-151809, filed on Jul. 8, 2011, the entire contents of each of which are incorporated herein by reference.

BACKGROUND OF THE INVENTION

Field of the Invention

The present invention relates to an inertial drive actuator that causes a movable member to move in a predetermined direction.

Description of the Related Art

There is a known actuator in which saw-tooth pulses are supplied to an electromechanical transducer coupled with a drive shaft to shift the drive shaft in the axial direction, thereby moving a movable member frictionally coupled with the drive shaft in the axial direction. (Such an actuator will be hereinafter referred to as an "impact drive actuator" or "inertial drive actuator".)

Figure 9A:
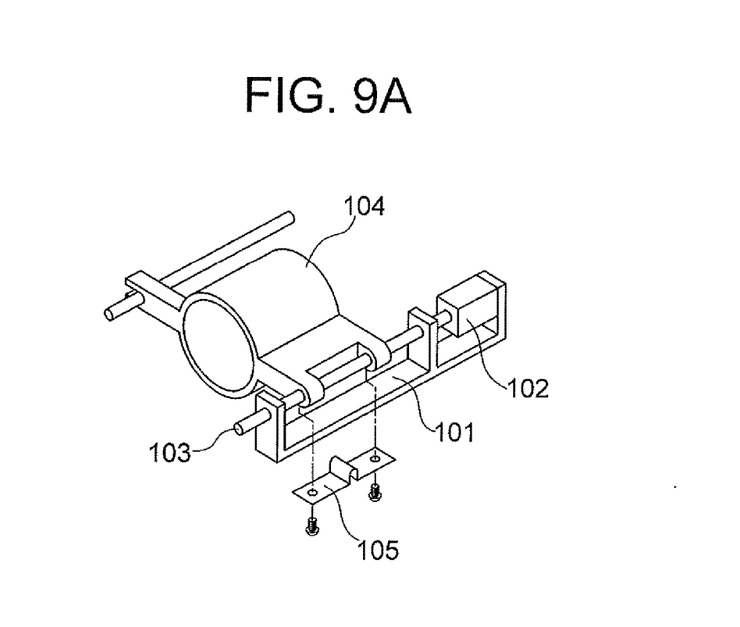

Such an impact drive actuator is disclosed in Japanese Patent Application Laid-Open No. 2007-288828. FIG. 9A shows the construction of the impact drive actuator. A vibration member 103 is inserted through holes provided in standing portions of a support member 101 and movable in the axial direction of the vibration member 103. One end of the vibration member 103 is fixed to one end of a piezoelectric element 102, the other end of which is fixed to the support member 101. With this construction, the vibration member 103 vibrates in the axial direction with the vibration of the piezoelectric element 102. A movable member 104 has two holes, through which the vibration member 103 is inserted. A leaf spring 105 is attached to the movable member 104 from below. A projection provided on the leaf spring 105 is pressed against the vibration member 103. The pressure exerted by the leaf spring 105 brings the movable member 104 and the vibration member 103 into frictional coupling with each other.

Figure 9B:
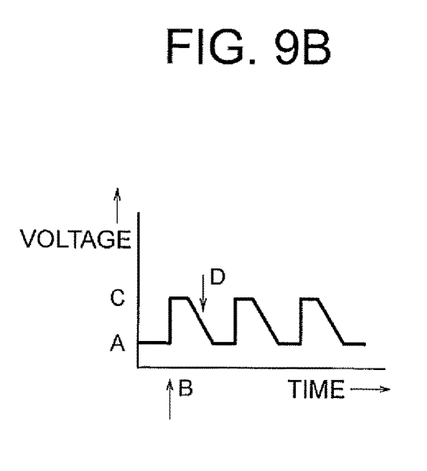
Figure 9C:
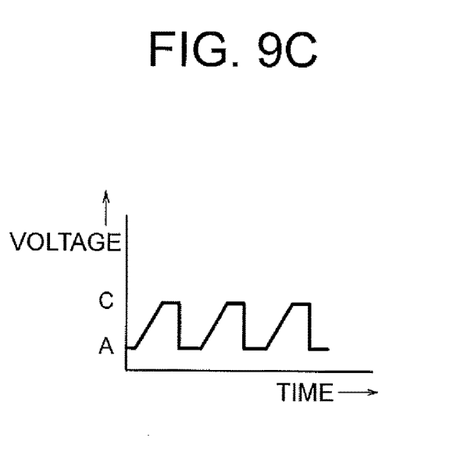

FIGS. 9B and 9C show waveforms of driving pulses for driving the impact drive actuator. FIG. 9B shows a waveform of driving pulses for moving the movable member 104 to the right, and FIG. 9C shows a waveform of driving pulses for moving the movable member 104 to the left. The operation principle of the impact drive actuator will be described in the following with reference to these driving pulse waveforms. In the following description, it is assumed that the direction in which the piezoelectric element 102 expands is the left, and the direction in which the piezoelectric element contracts is the right.

When the movable member 104 is to be moved to the right, the driving pulse waveform shown in FIG. 9B is used. The driving pulse waveform has steep rise portions and gradual fall portions. The steep rise portions of the driving pulse waveform cause the piezoelectric element 102 to expand quickly. Because the vibration member 103 is fixed to the piezoelectric element 102, the vibration member 103 moves to the left at high speed with the quick expansion of the piezoelectric element 102. During that time, the inertia of the movable member 104 overcomes the frictional coupling force between it and the vibration member 103 (i.e. frictional force between the vibration member 103 and the movable member 104 pressed against it by the leaf spring 105), and therefore the movable member 104 does not move to the left but stays at its position.

The gradual fall portions of the driving pulse waveform causes the piezoelectric element 102 to contract slowly. Then, the vibration member 103 slowly moves to the right with the slow contraction of the piezoelectric element 102. During that time, the inertia of the movable member 104 cannot overcome the frictional coupling force between it and the vibration member 103, and therefore the movable member 104 moves to the right with the movement of the vibration member 103.

On the other hand, when the movable member 104 is to be moved to the left, the driving pulse waveform shown in FIG. 9C is used. The driving pulse waveform has gradual rise portions and steep fall portions. The gradual rise portions of the driving pulse waveform cause the piezoelectric element 102 to expand slowly. Then, the vibration member 103 moves slowly to the left with the slow expansion of the piezoelectric element 102. During this time, the inertia of the movable member 104 cannot overcome the frictional coupling force between it and the vibration member 103, and therefore the movable member 104 moves to the left with the movement of the vibration member 103.

On the other hand, during the steep rise portions of the driving pulse waveform, the inertia of the movable member 104 overcomes the frictional coupling force between it and the vibration member 103, as with the case described above with reference to FIG. 9B, and therefore the movable member 104 does not move to the right but stays at its position.

Since the vibration member 103 is always pressed by the leaf spring 105, the movable member 104 is frictionally supported by the vibration member 103. In consequence, when the movable member 104 is stationary, its position is maintained.

As described above, the impact drive actuator utilizes the frictional coupling of the movable member 104 and the vibration member 103 provided by the leaf spring 105 and the inertia, and it can move the movable member 104 using driving pulse waveforms shown in FIGS. 9B and 9C.

The impact drive actuator disclosed in Japanese Patent Application Laid-Open No. 2007-288828 uses a leaf spring to provide a frictional force between the vibration member 103 and the movable member 104.

SUMMARY OF THE INVENTION

An inertial drive actuator according to the present invention comprises a shift unit that generates a small shift in a first direction and in a second direction opposite to the first direction, a vibration base plate that moves to and fro with the small shift of the shift unit, and a mover disposed on a flat surface of the vibration base plate and having a first magnetic field generating unit, wherein the mover comprises a first yoke that guides magnetic flux generated by the first magnetic field generating unit in such a way that the magnetic flux generated by the first magnetic field generating unit concentrates on a surface of the mover facing the vibration base plate with respect to both S and N poles, the inertial drive actuator further comprises a second yoke disposed on a side of the vibration base plate facing away from the mover, and a frictional force acting between the mover and the vibration base plate is controlled by controlling a magnetic field generated by the first magnetic field generating unit to drive the mover.

BRIEF DESCRIPTION OF DRAWINGS

FIGS. 1A and 1B show the structure of an inertial drive actuator according to a first embodiment, where FIG. 1A is a side view, and FIG. 1B is a cross sectional view;

FIGS. 3A and 3B show the structure of an inertial drive actuator according to a third embodiment, where FIG. 3A is a side view, and FIG. 3B is a cross sectional view;

FIGS. 9A, 9B, and 9C show an impact drive actuator according to a prior art, where FIG. 9A shows the construction of the actuator, FIG. 9B shows a waveform of driving pulses for shifting the mover to the right, and FIG. 9C shows a waveform of driving pulses for shifting the mover to the left.

DETAILED DESCRIPTION OF THE INVENTION

The construction, operations, and advantages of inertial drive actuators according to several embodiments will be described. It should be understood that the present invention is not limited by the embodiments. Although a lot of specific details will be described in the following description of the embodiments for the purpose of illustration, various modifications and changes can be made to the details without departing from the scope of the invention. The illustrative embodiments of the invention will be described in the following without any intension of invalidating the generality of or imposing any limitations on the claimed invention.

(First Embodiment)

Figure 1A:
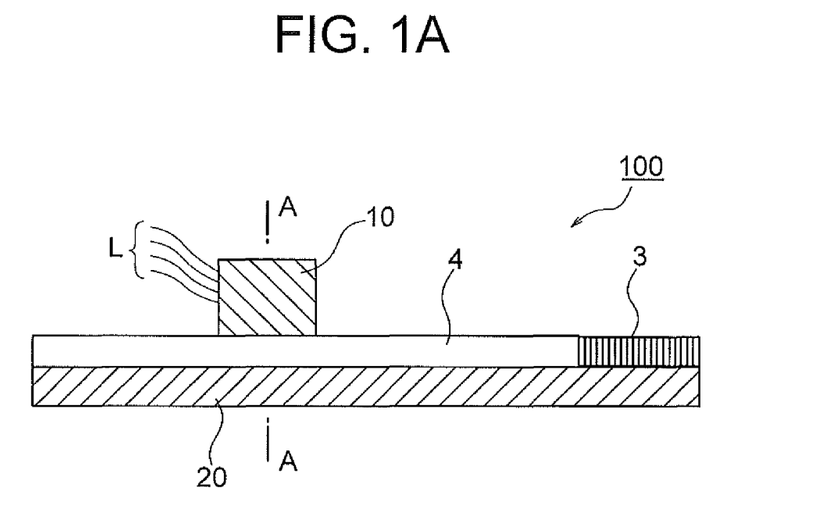
Figure 1B:
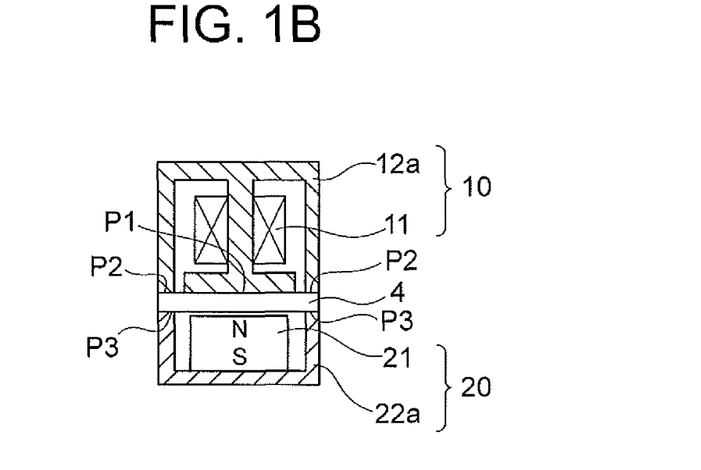

FIGS. 1A, 1B, and 1C show an inertial drive actuator according to a first embodiment. FIG. 1A is a side view of the inertial drive actuator, and FIG. 1B is a cross sectional view taken along line A-A in FIG. 1A.

The inertial drive actuator 100 according to the first embodiment includes a piezoelectric element (shift unit) 3, a vibration base plate 4, a mover 10, and a stator 20. The piezoelectric element 3 and the vibration base plate 4 are disposed on top of the stator 20, and the mover 10 is disposed on top of the vibration base plate 4.

The mover 10 includes a coil 11 (first magnetic field generating unit) and a first yoke 12a. The first yoke (magnetic flux guide member) 12a is a grooved member having a groove (or recess), which is partitioned by a T-shaped member at its center. The coil 11 is wound in a cylindrical shape around a coil core surrounding the T-shaped member. Wiring L for supplying electric current to the coil 11 extends out of the first yoke 12a. The grooved member and the T-shaped member are connected with each other.

The piezoelectric element 3 and the vibration base plate 4 are both plate-like members. The vibration base plate 4 is made of a non-magnetic material. One end of the piezoelectric member 3 and one end of the vibration base plate 4 are mechanically connected. Their connection is not limited to mechanical connection, but they may be adhered to each other. The piezoelectric element 3 and the vibration base plate 4 are disposed on top of the stator 20. The piezoelectric member 3 generates a small shift or displacement, which causes the vibration base plate 4 to move to and fro.

The stator 20 includes a permanent magnet 21 (second magnetic field generating unit) and a second yoke (magnetic flux guide member) 22a. The permanent magnet 21 is a cuboid component having an N-pole on one side and an S-pole on the other side. The second yoke 22a is a box-like component. The permanent magnet 21 is disposed inside the second yoke 22a with its N-pole side facing upward. The permanent magnet 21 is fixed on the bottom of the second yoke 22a.

Now, the operation of the inertial drive actuator 100 will be described. The principle of driving (or method of driving) will be described with reference to FIG. 6. Current is supplied to the coil 11 in such a way that the S-pole is generated in the downward direction in the drawing. The yoke 12a is arranged on both sides of the coil 11. Therefore, the first yoke 12a can prevent magnetic flux generated by the coil 11 from leaking to the outside. In consequence, the S-pole concentrates to the center P1 of the lower part of the first yoke 12a, and the N-pole concentrates to both ends P2 of the lower part of the first yoke 12a.

Figure 6:
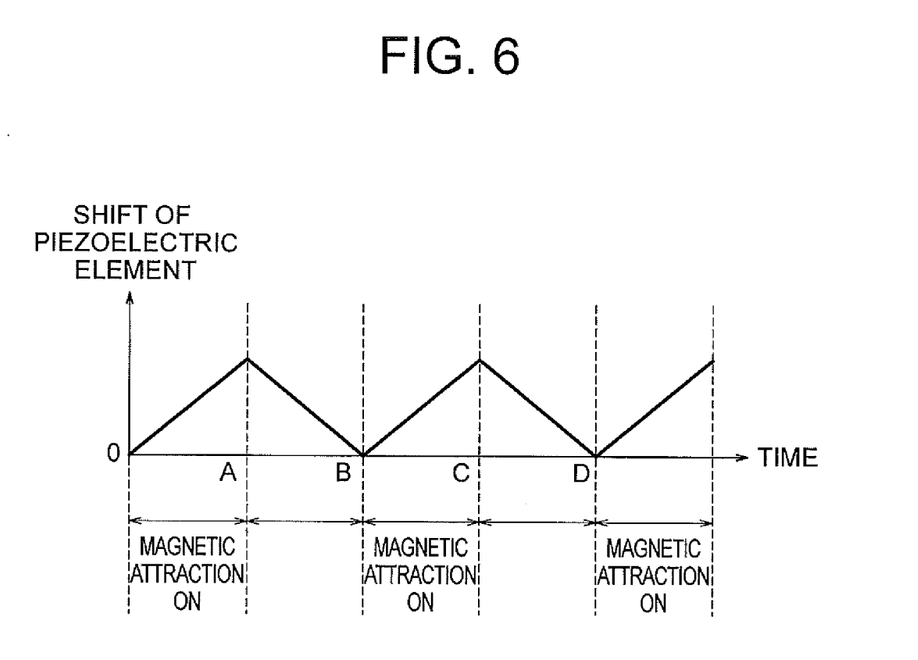
FIG. 6 illustrates a method of driving in operating the inertial drive actuator 100 according to the first embodiment.

On the other hand, in the stator 20 opposed to the first yoke 12a, the permanent magnet 21 is surrounded by the second yoke 22a. Therefore, the second yoke 22a can prevent magnetic flux generated by the permanent magnet 21 from leaking to the outside. In consequence, the N-pole concentrates to the upper part of the permanent magnet 21, and the S-pole concentrates to both ends P3 of the upper part of the second yoke 22a.

As described above, in the inertial drive actuator 100 according to this embodiment, magnetic flux is prevented from leaking out of the mover 10 or out of the stator 20, whereby the S-pole and the N-pole can be concentrated to predetermined regions. Consequently, magnetic attractive force can be generated efficiently in the downward direction in the drawing between the mover 10 and the stator 20.

Conversely, when current is supplied to the coil 11 in such away that the S-pole is generated in the upward direction in the drawing, the N-pole concentrates to the center P1 of the lower part of the first yoke 12a, and the S-pole concentrates to both ends P2 of the lower part of the first yoke 12a. On the other hand, in the stator 20 opposed to the first yoke 12a, the N-pole concentrates to the upper part of the permanent magnet 21, and the S-pole concentrates to both ends P3 of the upper part of the second yoke 22a. Consequently, magnetic repulsive force can be generated efficiently in the upward direction in the drawing between the mover 10 and the stator 20.

The magnitude of the normal force acting between the mover 10 and the vibration base plate 4 (or the magnetic attractive or repulsive force acting between the mover 10 and the stator 20) can be varied by varying the amount of current supplied to the coil 11. This enables controlling the frictional force between the mover 10 and the vibration base plate 4.

As described above, the inertial actuator 100 according to this embodiment utilizes a magnetic force to move or drive the mover 10. Thus, the inertial drive actuator 100 according to this embodiment is free from an elastic member that might wear by driving. Therefore, moving or driving the mover 10 does not lead to wearing. Consequently, it is possible to move or drive the mover 10 (i.e. to move it to a desired position and to keep it at a desired position) stably for a long period of time. Moreover, the use of the yoke in the inertial drive actuator 100 according to this embodiment enables prevention of the leakage of magnetic flux to the outside. Consequently, the magnetic attractive force and the magnetic repulsive force can be generated efficiently. Therefore, the mover 10 can be moved or driven efficiently, while the inertial drive actuator is simple in structure and can be made at low cost.

(Second Embodiment)

Next, an inertial drive actuator according to a second embodiment will be described. The components same as those in the first embodiment will be denoted by the same reference characters to eliminate redundant descriptions.

Figure 2:
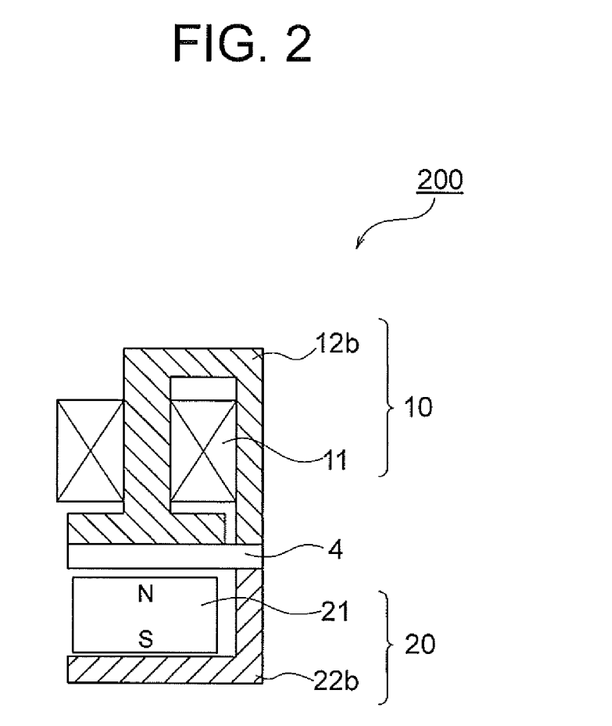
FIG. 2 is a cross sectional view similar to FIG. 1B, showing the structure of an inertial drive actuator according to a second embodiment.

FIG. 2 is a cross sectional view of the inertial drive actuator similar to FIG. 1B.

The inertial drive actuator 200 according to the second embodiment includes a piezoelectric element 3 (not shown in FIG. 2), a vibration base plate 4, a mover 10, and a stator 20. The piezoelectric element 3 and the vibration base plate 4 are disposed on top of the stator 20, and the mover 10 is disposed on top of the vibration base plate 4.

In the mover 10 of the inertial drive actuator 100 according to the first embodiment, the first yoke 12a covers two portions of the coil 11. In contrast, in the mover 10 of the inertial drive actuator 200 according to this embodiment, the first yoke 12b covers only one of the two portions of the coil 11. In other words, while in the inertial drive actuator 100 according to the first embodiment, the first yoke 12a is provided for two side portions of the coil 11, in the inertial drive actuator 200 according to this embodiment, the first yoke 12b is provided only for one side portion of the coil 11.

Referring to the stator 20, while in the inertial drive actuator 100 according to the first embodiment the second yoke 22a is provided on both sides of the permanent magnet 21, in the inertial drive actuator 200 according to this embodiment the second yoke 22b is provided on only one side of the permanent magnet 21.

As described above, the inertial drive actuator 200 according to this embodiment partly differs in structure from the inertial drive actuator 100 according to the first embodiment. Nevertheless, the inertial drive actuator 200 according to this embodiment has advantages in magnetic attractive and repulsive forces substantially the same as the inertial drive actuator 100 according to the first embodiment. In the inertial drive actuator 200 according to this embodiment, the first yoke 12b and the second yoke 22b are disposed on only one side of the coil 11 and the permanent magnet 21. Therefore, if the overall size of the inertial drive actuator is the same as the first embodiment, the number of turns of the coil can be made larger in this embodiment than in the first embodiment. Consequently, if the current supplied to the coil 11 is the same as the first embodiment, higher magnetic flux density can be achieved, leading to increased magnetic attractive and repulsive forces.

(Third Embodiment)

Next, an inertial drive actuator according to a third embodiment will be described.

Figure 3A:
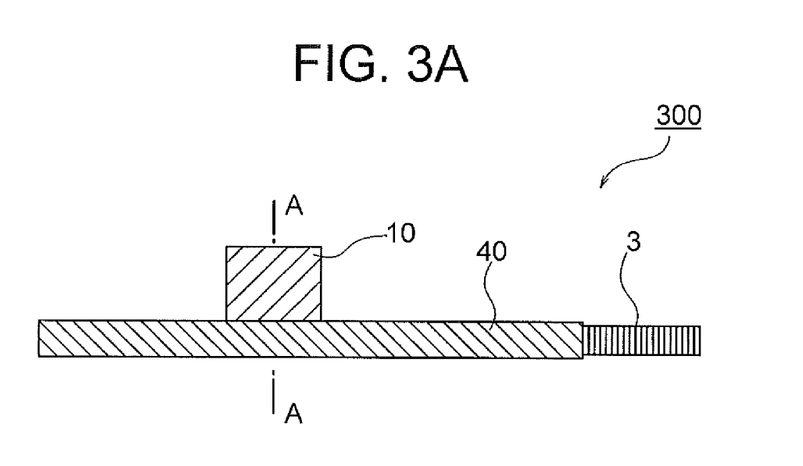
Figure 3B:
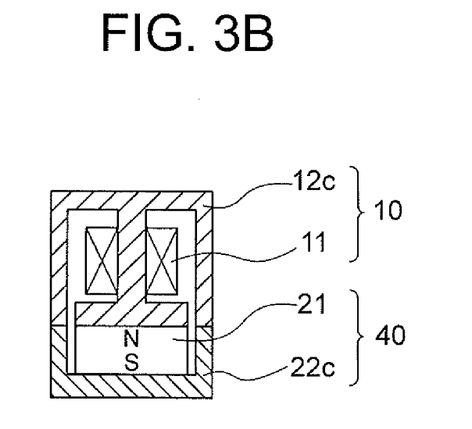

FIG. 3A is a side view of the inertial drive actuator, and FIG. 3B is a cross sectional view taken along line A-A in FIG. 3A. The components same as those in the inertial drive actuator according to the first embodiment will be denoted by the same reference characters to eliminate descriptions thereof. Wiring is not illustrated in these drawings.

The inertial drive actuator 300 according to the third embodiment includes a piezoelectric element 3, a mover 10, and a vibration base plate 40. The mover 10 is disposed on top of the vibration base plate 40. One end of the piezoelectric member 3 and one end of the vibration base plate are mechanically connected.

The mover 10 includes a coil 11 and a first yoke 12c. The structure of the mover 10 is the same as that of the mover 10 in the first embodiment and will not be described further. The mover 10 in this embodiment plays the same role as the mover 10 in the first embodiment. The vibration base plate 40 includes a permanent magnet 40 and a second yoke 22c. The vibration base plate 40 plays the same role as the stator 20 in the first embodiment as well as the vibration base plate 4.

The inertial drive actuator 300 according to this embodiment includes components having the same functions as components in the inertial drive actuator 100 according to the first embodiment, and has the same advantages as the inertial drive actuator 100 according to the first embodiment accordingly. Since the vibration base plate 40 in the inertial drive actuator 300 according to this embodiment plays multiple roles, reduction in the size of the actuator can be achieved.

(Fourth Embodiment)

Next, an inertial drive actuator according to a fourth embodiment will be described.

Figure 4:
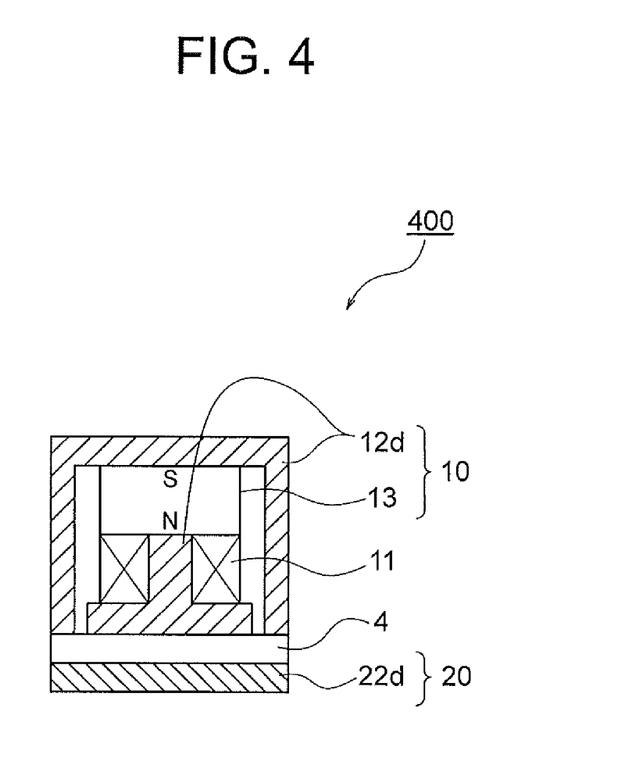
FIG. 4 is a cross sectional view similar to FIG. 1B, showing the structure of an inertial drive actuator according to a fourth embodiment.

FIG. 4 is a cross sectional view of the inertial drive actuator similar to FIG. 1B. The components same as those in the first embodiment will be denoted by the same reference characters to eliminate descriptions thereof.

The inertial drive actuator 400 according to the fourth embodiment includes a piezoelectric element 3 (not shown in FIG. 4), a vibration base plate 4, a mover 10, and a stator 20. The piezoelectric element 3 and the vibration base plate 4 are disposed on top of the stator 20, and the mover 10 is disposed on top of the vibration base plate 4.

The mover 10 includes a coil 11, a first yoke 12d, and a permanent magnet 13. The first yoke 12d is a grooved member having a groove, which is partitioned by a T-shaped member at its center. The coil 11 is wound in a cylindrical shape around a coil core surrounding the T-shaped member. The grooved member and the T-shaped member are separated from each other, and the permanent magnet 13 is arranged between them. The permanent magnet 13 is disposed with its N-pole facing the T-shaped member. The stator 20 has a second yoke 22d.

This embodiment differs from the first embodiment in that it lacks the permanent magnet 21 (second magnetic field generating unit) in the first embodiment.

In the inertial drive actuator 400 having the above-described construction, when current is supplied to the coil 11, for example, in such a way that the N-pole is generated in the downward direction in the drawing. Then, the N-pole concentrates to the center of the lower part of the first yoke 12d, and the S-pole concentrates to both ends of the lower part of the first yoke 12d.

As to the magnetic flux generated by the permanent magnet 13 also, the N-pole concentrates to the center of the lower part of the first yoke 12d, and the S-pole concentrates to both ends of the lower part of the first yoke 12d. In the stator 20 opposed to the first yoke 12d, magnetization in the reverse polarity is induced in the second yoke 22d. Specifically, an S-pole is induced at the center of the second yoke 22d, and N-poles are induced at both ends of the second yoke 22d. Consequently, a magnetic attractive force stronger than that in the case where no current is supplied to the coil 11 acts on the mover 10 in the downward direction in the drawing.

On the other hand, when current is supplied to the coil 11 in such a way that the N-pole concentrates to the upward direction in the drawing, a magnetic attractive force weaker than that in the case where no current is supplied to the coil 11 is generated. The magnitude of the normal force acting between the mover 10 and the vibration base plate 4 can be varied by varying the current supplied to the coil 11. This enables controlling the frictional force between the mover 10 and the vibration base plate 4.

As described above, in the inertial drive actuator 400 according to this embodiment, a magnetic force is used in moving or driving the mover 10. Thus, the inertial drive actuator 400 according to this embodiment is free from an elastic member that might wear by driving. Therefore, moving or driving the mover 10 does not lead to wearing. Consequently, it is possible to move or drive the mover 10 (i.e. to move it to a desired position and keep it at a desired position) stably for a long period of time. Moreover, the use of the yoke in the inertial drive actuator 400 according to this embodiment enables prevention of the leakage of magnetic flux to the outside. Consequently, the magnetic attractive force and the magnetic repulsive force can be generated efficiently. Therefore, the mover 10 can be moved or driven efficiently.

(Fifth Embodiment)

Figure 5:
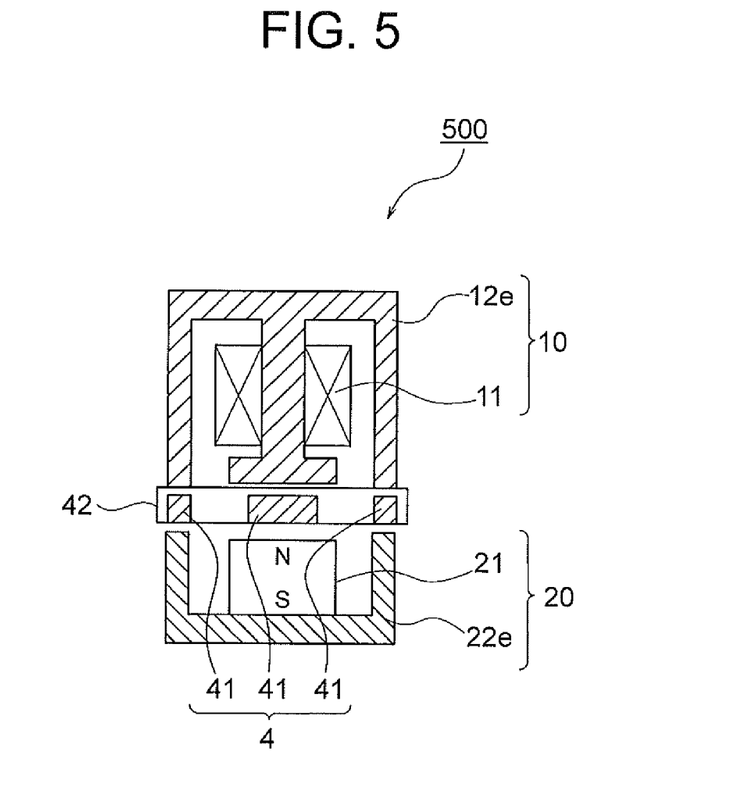
FIG. 5 is a cross sectional view similar to FIG. 1B, showing the structure of an inertial drive actuator according to a fourth embodiment.

Next, an inertial drive actuator according to a fifth embodiment will be described. FIG. 5 is a cross sectional view of the inertial drive actuator similar to FIG. 1B. The components same as those in the first embodiment will be denoted by the same reference characters and will not be described further.

The inertial drive actuator 500 according to the fifth embodiment includes a piezoelectric element 3 (not shown in FIG. 5), a vibration base plate 4, a mover 10, and a stator 20. The piezoelectric element 3 and the vibration base plate 4 are disposed on top of the stator 20, and the mover 10 is disposed on top of the vibration base plate 4.

The inertial drive actuator 500 according to the fifth embodiment differs from the inertial drive actuator 100 according to the first embodiment in the structure of the vibration base plate. While the vibration base plate 4 in the first embodiment is made only of non-magnetic material, the vibration base plate 4 in this embodiment includes a magnetic part 41 and a non-magnetic part 42. The magnetic part functions as a yoke. The magnetic part 41 includes three separate parts, which are arranged at the center of the vibration base plate 4 and on both sides of the center. The center magnetic part 41 is substantially opposed to the T-shaped member (of the first yoke 12e). The side magnetic parts 41 are substantially opposed to the edges of the grooved member (of the first yoke 12e).

In the inertial drive actuator 500 according to this embodiment, magnetic flux guided by the first yoke 12e of the mover 10 and magnetic flux guided by the second yoke 22e of the stator 20 flow through the magnetic parts 41 in the vibration base plate 4. Therefore, better prevention of leakage of magnetic flux can be achieved advantageously. In particular, leakage of magnetic flux to the outside in the region near the lower edges of the first yoke 12e and the upper edges of the second yoke 22e can be reduced greatly by virtue of the two side magnetic parts 41 existing between them.

Next, the method of driving in the inertial drive actuator according to the embodiments will be described. FIG. 6 illustrates the method of driving in an inertial drive actuator, e.g. the inertial drive actuator 100 according to the first embodiment. In FIG. 6, the horizontal axis represents time, and the vertical axis represents shift of the piezoelectric element 3, where expanding shifts of the piezoelectric element 3 to the left in FIG. 1A are expressed by positive values.

During the time period from time 0 to time A, the piezoelectric element 3 is expanding. During this period, current is supplied to the coil 11 in such away that the S-pole is generated in the downward direction in the drawing. Then, the magnetic attractive force acting on the mover 10 in the direction toward the vibration base plate 4 increases. In consequence, the friction between the mover 10 and the vibration base plate 4 increases. Consequently, as the vibration base plate 4 moves to the left in the drawing with the expansion of the piezoelectric member 3, the mover 10 moves to the left in the drawing accordingly.

During the time period from time A to time B, the piezoelectric element 3 is contracting. During this period, current supply to the coil 11 is suspended. Then, no magnetic attractive force generated by the coil 11 acts on the mover 10. In consequence, the frictional force between the mover 10 and the vibration base plate 4 decreases. This means that the amount of slippage of the mover 10a relative to the movement of the vibration base plate 4 increases. Consequently, while the vibration base plate 4 moves to the right in the drawing with the contraction of the piezoelectric element, the mover 10 apparently stays stationary at the shifted position. In this way, while the piezoelectric element 3 is contracting, the mover 10 slips to the left relative to the vibration base plate 4, which moves to the right in the drawing. Thus, the mover 10 shifts to the left in the drawing during the time period from time 0 to time B.

As the same operation is performed repeatedly in the time period from time B to time C, the time period from time C to time D and so on, the mover 10 moves or shifts to the left in the drawing. The mover 10 can also be moved to the right in the drawing by reversing the timing of current supply to the coil 11 shown in FIG. 6. Specifically, the mover 10 is moved to the right in the drawing, by supplying the coil 11 with current with which a magnetic repulsive force acting between the mover 10 and the vibration base plate 4 is generated instead of current with which a magnetic attractive force acting between the mover 10 and the vibration base plate 4 is generated, during the time period from time 0 to time A.

While in the above-described illustrative case, current supply is suspended during the time period from time A to time B, the coil 11 may be supplied with current with which a magnetic repulsive force acts between the mover 10 and the vibration base plate 4 during this period. This also enables the mover 10 to move in the same manner as described above.

(Sixth Embodiment)

Next, an inertial drive actuator according to a sixth embodiment will be described.

Figure 7:
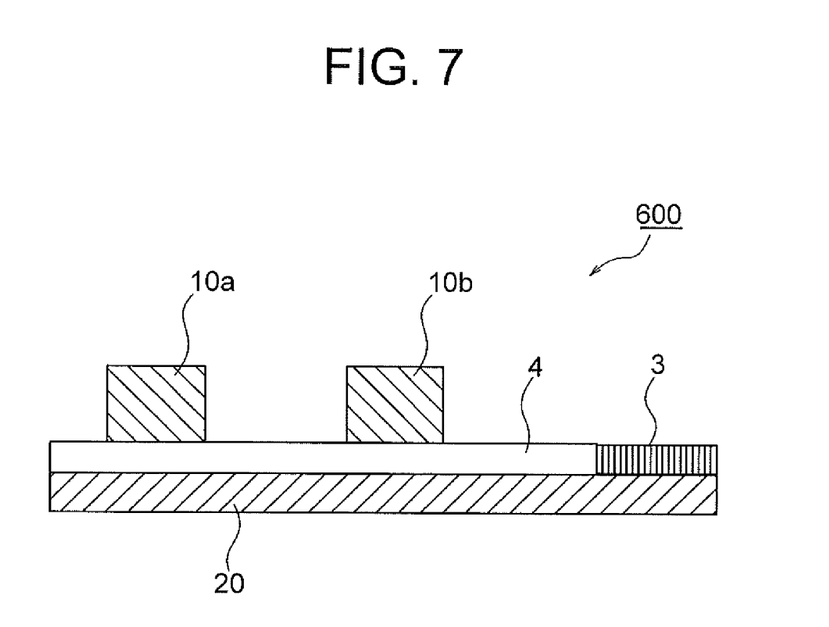
FIG. 7 is a side view showing the structure of an inertial drive actuator according to a sixth embodiment.
Figure 8A:
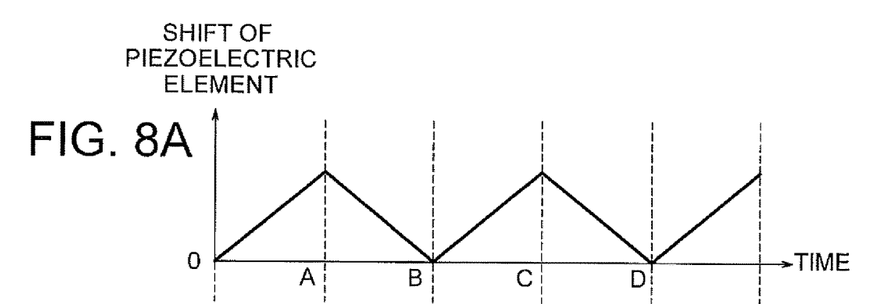
FIGS. 8A, 8B, and 8C illustrate a method of driving in operating the inertial drive actuator according to the sixth embodiment.
Figure 8B:
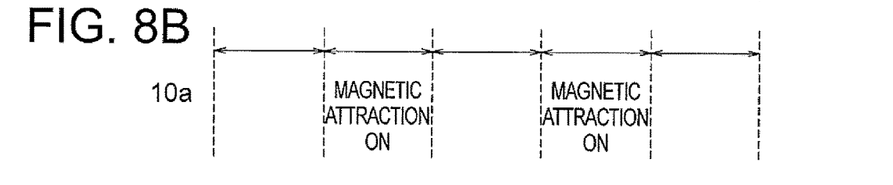
Figure 8C:
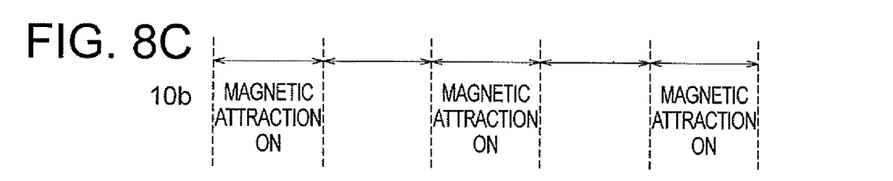

FIG. 7 is a side view of the inertial drive actuator similar to FIG. 1B. FIGS. 8A, 8B, and 8C illustrate a method of driving in the inertial drive actuator 100 according to the sixth embodiment.

The inertial drive actuator according to the sixth embodiment has two movers 10 like that in the inertial drive actuator 100 in the first embodiment. Specifically, the inertial drive actuator 600 according to the sixth embodiment includes a piezoelectric element 3, a vibration base plate 4, a mover 10a, a mover 10b, and a stator 20. The piezoelectric element 3 and the vibration base plate 4 are disposed on top of the stator 20, and the mover 10a and the mover 10b are disposed on top of the vibration base plate 4. Wiring is not illustrated in FIG. 7.

The method of driving in the inertial drive actuator 600 will be described. In FIGS. 8A, 8B, and 8C, the horizontal axis represents time, and the vertical axis represents shift of the piezoelectric element 3, where expanding shifts of the piezoelectric element 3 to the left in FIG. 7 are expressed by positive values.

During the time period from time 0 to time A, the piezoelectric element 3 is expanding. During this period, current is not supplied to the coil 11 in the mover 10a. Then, no magnetic attractive force acts on the mover 10a. Consequently, the mover 10a stays stationary without changing its position. On the other hand, current is supplied to the coil 11 in the mover 10b in such a way that the S-pole is generated in the downward direction in the drawing. Then, a magnetic attractive force acts on the mover 10b in the direction toward the vibration base plate 4, as described above with reference to FIG. 6. In consequence, the mover 10b moves to the left in the drawing.

During the time period from time A to time B, the piezoelectric element 3 is contracting. During this period, current is supplied to the coil 11 in the mover 10a in such a way that the S-pole is generated in the downward direction in the drawing. Then, a magnetic attractive force acts on the mover 10a in the direction toward the vibration base plate 4, as described above with reference to FIG. 6. In consequence, the mover 10a moves to the right in the drawing. On the other hand, current is not supplied to the coil 11 in the mover 10b. Then, no magnetic attractive force acts on the mover 10b. Consequently, the mover 10b stays stationary without changing its position.

As described above, during the time period from time 0 to time A, the mover 10a stays stationary, and the mover 10b moves to the left in the drawing or toward the mover 10a. On the other hand, during the time period from time A to time B, the mover 10a moves to the right in the drawing or toward the mover 10b, and the mover 10b stays stationary. Consequently, the mover 10a and the mover 10b can be brought closer to each other. By performing the driving operation during the time period from time 0 to time B repeatedly, the mover 10a and the mover 10b can be brought further closer to each other. Moreover, by changing the driving method, it is also possible to move the mover 10a and the mover 10b in the same direction or to move the mover 10a and the mover 10b away from each other.

While a construction with two movers and a method of driving thereof have been described by way of illustration with reference to FIGS. 7, 8A, 8B, and 8C, more than two movers can be moved independently from each other on the same vibration base plate according to the same principle. Moreover, because the mover includes a coil in all of the first to fifth embodiments, the principle of driving illustrated in FIGS. 7, 8A, 8B, and 8C can be applied to all the embodiments. Therefore, it is possible to move a plurality of movers independently from each other on the same vibration base plate in the inertial drive actuators according to the embodiments.

Various modification can be made without departing from the essence of the present invention.

As described above, the present invention can suitably be applied to an inertial drive actuator capable of operating stably for a long period of time, for example in moving a mover to a desired position, stopping the mover at a desired position, and keeping the mover stationary.

The present invention can provide an inertial drive actuator that uses a magnetic force to reduce adverse effects of wearing etc. and can move or drive a mover efficiently by using a yoke.

What is claimed is:

1. An inertial drive actuator comprising:
   a shift unit that generates a small shift in a first direction and in a second direction opposite to the first direction;
   a vibration base plate that moves to and fro with the small shift of the shift unit; and
   a mover disposed on a flat surface of the vibration base plate and having a first magnetic field generating unit, wherein
   the mover comprises a first yoke that guides magnetic flux generated by the first magnetic field generating unit in such a way that the magnetic flux generated by the first magnetic field generating unit concentrates on a surface of the mover facing the vibration base plate with respect to both S and N poles,
   the inertial drive actuator further comprises a second yoke disposed on a side of the vibration base plate facing away from the mover, and
   a frictional force acting between the mover and the vibration base plate is controlled by controlling a magnetic field generated by the first magnetic field generating unit to drive the mover;
   wherein the first yoke includes a cavity and the first yoke further having a member disposed within the cavity;
   the member includes a first portion extending from the first yoke towards the vibration base plate; and
   the member has a T-shape in cross-section.

2. The inertial drive actuator according to claim 1, further comprising a second magnetic field generating unit that generates a magnetic field relative to the magnetic field generated by the first magnetic field generating unit so that a magnetic attractive force or a magnetic repulsive force acts in the direction in which the mover is opposed to the vibration base plate, wherein
   the second yoke is located near the second magnetic field generating unit to guide the magnetic flux generated by the second magnetic field generating unit in such a way that the magnetic flux generated by the second magnetic field generating unit concentrates on its stator side surface with respect to both N and S poles, and
   a frictional force acting between the mover and the vibration base plate is controlled by controlling the magnetic field generated by the first magnetic field generating unit and the magnetic field generated by the second magnetic field generating unit to drive the mover.

3. The inertial drive actuator according to claim 1, wherein the first magnetic field generating unit comprises a magnet coil.

4. The inertial drive actuator according to claim 2, wherein the second magnetic field generating unit comprises a permanent magnet.

5. The inertial drive actuator according to claim 1, wherein the shift unit comprises a piezoelectric element.

6. The inertial drive actuator according to claim 1, wherein the vibration base plate is made of a non-magnetic material.

7. The inertial drive actuator according to claim 1, wherein the vibration base plate comprises a non-magnetic part and a magnetic part.

8. The inertial drive actuator according to claim 2, wherein at least a part of the vibration base plate comprises the second magnetic field generating unit.

9. The inertial drive actuator according to claim 1, wherein the vibration base plate also functions as the second yoke.

10. The inertial drive actuator according to claim 1, wherein the first magnetic field generating unit comprises a magnetic coil and a permanent magnet.

11. The inertial drive actuator according to claim 1, wherein the first magnetic field generating unit comprises a magnetic coil wound around the member.

12. The inertial drive actuator according to claim 1, wherein at least a portion of the first yoke has a L-shape in cross-section.

13. An inertial drive actuator comprising:
a shift unit that generates a small shift in a first direction and in a second direction opposite to the first direction;
a vibration base plate that moves to and fro with the small shift of the shift unit; and
a mover disposed on a first surface of the vibration base plate, the vibration base plate having a first magnetic field generating unit, wherein
the mover comprises a first yoke disposed on the first surface, the first yoke guides magnetic flux generated by the first magnetic field generating unit in such a way that the magnetic flux generated by the first magnetic field generating unit concentrates on a surface of the mover facing the vibration base plate with respect to both S and N poles,
the inertial drive actuator further comprises a second yoke opposed to the first surface such that at least one end portion of each of the first and second yokes oppose each other, and
a frictional force acting between the mover and the vibration base plate is controlled by controlling a magnetic field generated by the first magnetic field generating unit to drive the mover;
wherein the first yoke includes a cavity and the first yoke further having a member disposed within the cavity;
the member includes a first portion extending from the first yoke towards the vibration base plate; and
the member has a T-shape in cross-section.

* * * * *